United States Patent
Becker

(10) Patent No.: US 9,971,038 B2
(45) Date of Patent: May 15, 2018

(54) CHROMOTROPIC DETECTION OF IONIZING RADIATION

(71) Applicant: THE FLORIDA INTERNATIONAL UNIVERSITY BOARD OF TRUSTEES, Miami, FL (US)

(72) Inventor: David Becker, Parkland, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 67 days.

(21) Appl. No.: 14/777,034

(22) PCT Filed: Mar. 13, 2014

(86) PCT No.: PCT/US2014/025833
§ 371 (c)(1),
(2) Date: Sep. 15, 2015

(87) PCT Pub. No.: WO2014/151486
PCT Pub. Date: Sep. 25, 2014

(65) Prior Publication Data
US 2016/0033653 A1    Feb. 4, 2016

Related U.S. Application Data

(60) Provisional application No. 61/790,425, filed on Mar. 15, 2013.

(51) Int. Cl.
| | |
|---|---|
| *G01N 5/00* | (2006.01) |
| *G01T 1/06* | (2006.01) |
| *G01T 1/04* | (2006.01) |
| *B05D 1/18* | (2006.01) |
| *B05D 5/00* | (2006.01) |
| *B05D 7/02* | (2006.01) |

(52) U.S. Cl.
CPC ............... *G01T 1/06* (2013.01); *B05D 1/18* (2013.01); *B05D 5/00* (2013.01); *B05D 7/02* (2013.01); *G01T 1/04* (2013.01)

(58) Field of Classification Search
CPC ........................................................ G01T 1/06
See application file for complete search history.

(56) References Cited

U.S. PATENT DOCUMENTS 3,290,499 A * 12/1966 Vale .................. G01T 1/04
                                                              250/474.1
6,083,988 A    7/2000 Becker
(Continued)

OTHER PUBLICATIONS

"Packaging for Food Irradiation" to Chmielewski (2006), p. 1-22, available at http://www.iaea.org/inis/collection/NCLCollectionStore/_Public/38/005/38005202.pdf.*
(Continued)

*Primary Examiner* — Kenneth J Malkowski
(74) *Attorney, Agent, or Firm* — Saliwanchik, Lloyd & Eisenschenk

(57) ABSTRACT

A high contrast dosimeter is constructed where a plastic support is at least partially coated with a layer having a colored radical trapping compound. The plastic is a polymer that can contain a radiation sensitive plasticizer. The plastic forms radicals upon irradiation with high-energy (low wavelength) radiation. Upon diffusion of the radicals to the layer of radical trapping compound, reaction forms a compound with a different color than the radical trapping compound. In an embodiment of the invention, the plastic support is celluloid and the radical trapping compound is an azulenyl nitrone (AZN).

15 Claims, 1 Drawing Sheet

(56) References Cited

U.S. PATENT DOCUMENTS

| | | |
|---|---|---|
| 7,227,158 B1 | 6/2007 | Patel et al. |
| 2002/0068016 A1 | 6/2002 | Warner et al. |
| 2004/0240068 A1* | 12/2004 | Namazue ............... G02B 5/205 |
| | | 359/589 |
| 2006/0118732 A1 | 6/2006 | Blanton |
| 2012/0205591 A1 | 8/2012 | Patel |

OTHER PUBLICATIONS

Agosta, W.C. et al., "The Solution Photolysis of Camphor," *Journal of the American Chemical Society*, Dec. 4, 1968, pp. 7025-7030, vol. 90, No. 25.

Cakić, S. et al., "Physical-Mechanical Properties of Nitrodopes Affected by Ultra-Violet Radiation," *Sensors*, 2007, pp. 2139-2156, vol. 7.

Donanus, J.C. "Recording Radiographic Images on Nitrocellulose Film in Neutron Radiography of Nuclear Reactor Fuel," Aug. 1987, Riso National Laboratory, DK-4000, Roskilde, Denmark, Accepted for presentation at the Fourth European Conference on Non-Destructive Testing, Sep. 13-17, 1987, London, England.

Kim, J.O.A. et al., "The Design of an Irradiation Facility for the Destruction of Spent Nitrocellulose Plastic Explosives," Twenty Sixth Annual CNS-CAN Student Conference, Toronto, Ontario, Canada, Jun. 10-13, 2001.

* cited by examiner

CHROMOTROPIC DETECTION OF IONIZING RADIATION

CROSS-REFERENCE TO RELATED APPLICATIONS

This application is the U.S. national stage application of International Patent Application No. PCT/US2014/025833, filed Mar. 13, 2014, which claims the benefit of U.S. Provisional Application Ser. No. 61/790,425, filed Mar. 15, 2013, the disclosures of which are hereby incorporated by reference in their entireties, including any figures, tables, or drawings.

BACKGROUND OF THE INVENTION

The monitoring of radiation exposure of inanimate objects and individuals is an important function in a number of medical, research, and industrial situations, such as nuclear power generation. To this end, dosimeters that vividly display that an exposure event has occurred are important. For example, medical equipment and glassware are commonly sterilized by irradiation in the range of 15-25 kGy using alanine pellets and ceric-cerous solution as dosimeters. Typically, dosimeters change color in a very narrow color range, such as from yellow to orange or yellow to red and are, at times, inconsistent with the amount of color change they experience after radiation. To this end a dosimeter with a higher contrast between the unexposed and the exposed state is desired.

DETAILED DISCLOSURE

Figure 1:
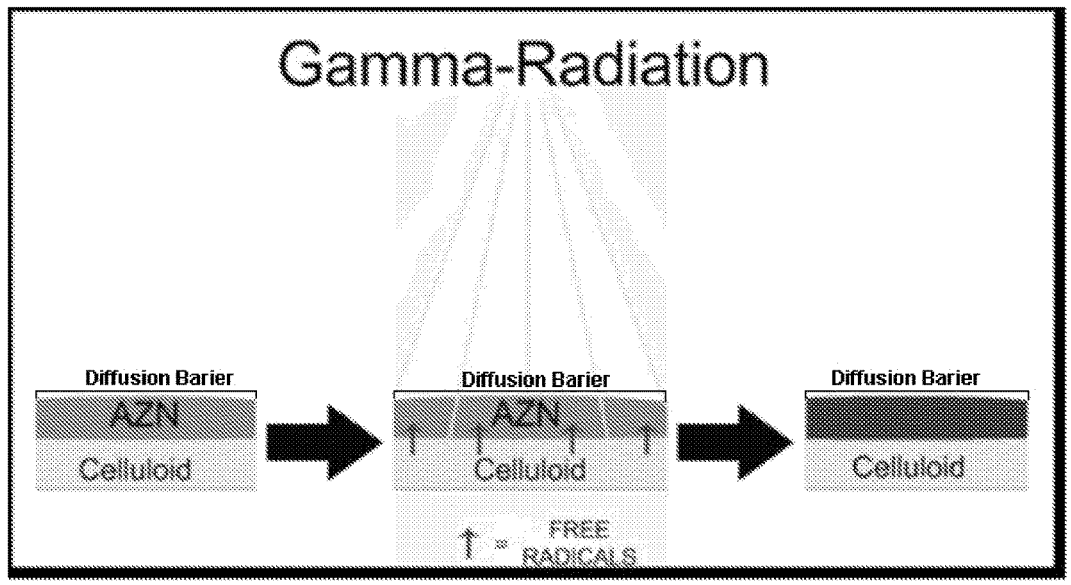
FIG. 1 is a schematic diagram showing use of a dosimeter, according to an embodiment of the invention, whereupon the color displayed by the pre-irradiation dosimeter differs from that of the color of the post-irradiated dosimeter.

Gamma ray, X-ray and even extreme ultraviolet rays can be useful, for example, in sterilization of surfaces and solutions and medical imagining. To this end, the ability to rapidly and definitively appreciate that significant exposure has occurred is critical. Embodiments of the invention are directed to a dosimeter that displays an easily distinguished color change upon exposure to radiation of wavelengths smaller than about 10 nm. The dosimeter is a solid object, for example, a plate or any other shape that can be easily viewed, and, if desired, compared with a scale to reflect the degree of transformation of the color without the use of a spectrophotometer. The dosimeter comprises a radical trapping compound situated as an indicator layer or coating on the surface of a solid plastic support. Upon radiation, the transformed indicator layer reflects a color that differs by at least 100 nm in the visible spectrum from the color before transformation of the radical trapping compound. For example, a color change from green to red can occur. The transformation is an irreversible transformation such that, upon irradiation, no reversion to the initial compound and its color occurs. The radical trapping compound can be deposited as a layer or coating on a plastic surface by any coating method, including, but not limited to, dip-coating, spray-coating, roll-coating, painting, stamping, and ink-jet printing.

In embodiments of the invention, the color transformation is due to a combination of a radical with a colored radical trapping compound. Radicals diffuse from the radiation sensitive polymer and/or plasticizer in the support to the radical trapping compound of the indicator layer. The solid plastic support can be an intrinsic plastic polymer or a plasticized polymer. The polymer and/or the uniformly dispersed plasticizer are at least one radiation sensitive compound that forms at least one diffusible radical species upon exposure to high-energy radiation. The plasticizer can be present in a relatively high proportion of the plastic support and is uniformly dispersed therein. As used herein, the plasticizer can be a compound for the generation of radicals but have little or no suppression of the glass transition of the polymeric material used as the plastic, or where the polymer acts as the radiation sensitive compound, a plasticizer can be employed that does not form radicals but can function in the normal manner of a plasticizer. Radicals formed, generally in pairs, within the plastic or plasticized polymer from radiation induce bond homolysis, can be formed sufficiently close to the radical trapping surface such that the radicals can diffuse to the radical trapping surface without self- or cross-annihilation. In an embodiment of the invention, at least one pair of radicals can be in equilibrium with a molecule that can enhance diffusion and dissociate in the presence of the radical trapping compounds in the indicator layer. When the formed radical diffuses in any manner to the indicator layer where the radical trapping compounds reside, an irreversible addition occurs with a desired color change.

The plastic support can be transparent or opaque. The polymeric support and plasticizer are typically, but not necessarily, colorless or of little color such that the eye can readily discern the color change of the dosimeter. The plasticizer can be in the solid polymeric support at about 5 to about 50% by weight. The dosimeter can further comprise a film or other screen on the exposure surface of the dosimeter. The film or screen shields the dosimeter from lower energy wavelengths that can give a false indication of exposure to higher energy wavelengths. For example, the dosimeter can have a coating, or even a glass plate, on the exposure surface(s) to act as a filter layer to filter UV radiation from the dosimeter. In an embodiment of the invention, the radical trapping compound is an indicator layer sandwiched between two like plastic sheets where diffusible radicals are formed upon radiation of either face of the radical trapping layer of the dosimeter. The plastic sheets can act as the UV filter, even those that may form radicals by UV or other lower energy irradiation, but the penetration of the UV is not to a significant depth, such that radicals formed on their external surfaces cannot diffuse to the center layer before radical annihilation occurs.

In embodiments of the invention, the radical trapping compound is an azulenyl nitrone (AZN) of the structure:

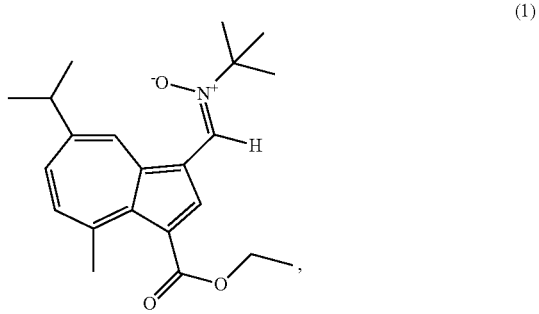

(1)

which displays a green color and upon reaction with a radical displays a red color. This radical trapping compound, AZN, is disclosed in Becker, U.S. Pat. No. 6,083,988, where other AZNs having the same or a similar chromophore with a variety of different substituents are taught. Any of the AZNs disclosed therein can be employed for the formation of the dosimeters, according to embodiments of the invention. Becker is herein incorporated by reference.

In an embodiment of the invention, the plastic is celluloid, which comprises nitrocellulose plasticized by camphor. Celluloid undergoes radiation damage at a threshold dosage of approximately 10 kGy. The irradiation of nitrocellulose forms $NO_2\cdot$ radical which is in equilibrium with the dimer by the equation:

The AZN undergoes color change in the presence of the equilibrium mixture formed. Advantageously, by placing the AZN coated plastic within a barrier, color intensity is enhanced. Not to be bound by a mechanism, the greater intensity of the color change when a barrier is established is consistent with the restriction of diffusion of the equilibrium mixture from the vicinity of the AZN layer before the adduct can be formed. The barrier can be established by placing the dosimeter within a transparent container, or by adding a laminate or coating upon the dosimeter. Under otherwise equivalent conditions, the color change intensity within the barrier is greater than with the absence of the barrier. The barrier can be any material that permits viewing of the dosimeter, for example, polyethylene, polymethylmethacrylate, polycarbonate, or any other clear colorless plastic. Other materials can be used and colored materials can be used as long as the dosimeter is readily visible through the barrier and the color change is apparent to the eye. A barrier layer can also function as a UV filter.

In an embodiment of the invention, the dosimeter can be prepared with an adhesive backing, such that the dosimeter can be readily fixed to a surface. The adhesive can be a pressure sensitive adhesive used for tapes and can be adhered firmly to at least a portion of the dosimeter. In an embodiment of the invention, the dosimeter's plastic surface is distal to the surface with the radical trapping compound. In an embodiment of the invention, the surface of the adhesive distal to the dosimeter's plastic surface can be covered with, for example, a silicone release paper or other readily released covering. A dosimeter of this structure can be placed onto any desired surface by removing the release covering from the tape and attaching the dosimeter onto a surface to be monitored for radiation. In another embodiment of the invention, the adhesive acts as a barrier and is applied over the surface with the radical trapping compound and the plastic support acts as a barrier on a face of the dosimeter through which the color change is observed. Where the plastic support is a flexible plastic, the surface of the plastic can be a release surface for the adhesive applied to the surface with the radical trapping compound and the dosimeter can be in the form of a roll where a desired length can be cut from the roll and applied to a surface to be monitored.

Because there is a color change that increases in intensity as the concentration of the radical-radical trapping compound adducts increases, the dosimeter can indicate a cumulative dosage as well as an acute dosage as long as a saturation dosage, where all radical trapping compounds is consumed, has not occurred. The radical trapping layer can be deposited by methods that specifically place the radical trapping compound layer on only portions of the plastic. Picture or text warnings can be printed with the radical scavenging compound in the dosimeter. The deposition of dyes or other colored compounds can be carried out to form a contrast layer on portions of the plastic that interface or are close to the radical trapping compound layer(s). In this manner, the difference in the color between the radical trapping compound layer and the contrast layer can permit a more easily perceived color change of the radical trapping compound layer.

Methods and Materials

Figure 2:
FIG. 2 is a photograph of an exemplary dosimeter, according to an embodiment of the invention, whereby the pre-irradiation dosimeter (left) is olive-green in color and the post-irradiated dosimeter (right) is red in color.

A dosimeter, according to an embodiment of the invention, was prepared in the following manner. A solution was prepared by dissolving 5 mg of the AZN of structure (1) in 2 mL of acetone. A celluloid plastic object was dipped into the acetone solution of (1), and withdrawn and the acetone, where, upon evaporation of the acetone, the dosimeter forms. The dosimeter was exposed to approximately 30 kGy of γ-radiation (well above the minimum threshold for gamma radiation damage of cellulose) causing the release of free radicals, as indicated by a change in color, as is shown schematically in FIG. 1, evident the photograph of FIG. 2.

The pre-irradiation AZN-coated celluloid dosimeter 302, as shown in FIG. 3, received a dose of gamma radiation ranging between 29.03 and 29.57 kGy, indicated as the dosimeter under irradiation 304. Whereas the pre-irradiation dosimeter 302 displayed an olive green color, the post-irradiated dosimeter 306 displayed a red-orange color. This is shown photographically in FIG. 4 where the pre-irradiation dosimeter 402 is clearly different from the post-irradiation dosimeter 404.

All patents referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A high-energy radiation dosimeter, comprising:
   at least one plastic support comprising a radiation sensitive polymer and/or a polymer comprising at least one radiation sensitive plasticizer; and
   an indicator layer comprising a radical trapping compound on at least a portion of the plastic support, wherein the radiation sensitive polymer and/or the radiation sensitive plasticizer forms a diffusible radical upon irradiation with electromagnetic radiation having a wavelength less than 10 nm, wherein the radical diffuses from the plastic support into the indicator layer and reacts with the radical trapping compound to indicate the presence of the diffusible radical formed by radiation.

2. The high-energy radiation dosimeter of claim 1, wherein the radiation sensitive polymer is celluloid.

3. The high-energy radiation dosimeter of claim 1, wherein the radical trapping compound is an azulenyl nitrone (AZN).

4. The high-energy radiation dosimeter of claim 3, wherein the AZN is:

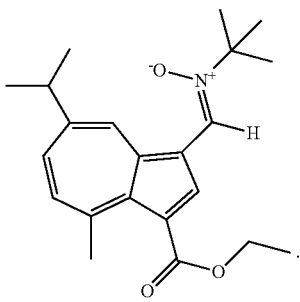
(1)

5. The high-energy radiation dosimeter of claim 1, further comprising a diffusion barrier, where the diffusion barrier comprises a container, coating or laminate layer.

6. The high-energy radiation dosimeter of claim 1, further comprising a filter layer wherein the filter layer blocks the transmission of UV radiation to the dosimeter.

7. The high-energy radiation dosimeter of claim 1, further comprising a contrast layer, wherein the contrast layer resides on at least one portion of the plastic support other than the at least one portion having the layer comprising a radical trapping compound.

8. The high-energy radiation dosimeter of claim 1, further comprising an adhesive layer.

9. The high-energy radiation dosimeter of claim 8, wherein the adhesive is a pressure sensitive adhesive.

10. A method of preparing a dosimeter according to claim 1, comprising:

providing a plastic support comprising a radiation sensitive polymer and/or a polymer comprising at least one radiation sensitive plasticizer, wherein the radiation sensitive polymer and/or the radiation sensitive plasticizer forms a diffusible radical upon irradiation with electromagnetic radiation having a wavelength less than 10 nm; and coating at least a portion of the plastic support with a radical trapping compound to form an indicator layer.

11. The method of claim 10, wherein the plastic support comprising the radiation sensitive polymer is celluloid.

12. The method of claim 10, wherein the radical trapping compound is an AZN.

13. The method of claim 10, wherein coating comprises dip-coating, spray-coating, roll-coating, painting, stamping, and ink jet printing.

14. A method of determining exposure to radiation, comprising:

providing a dosimeter according to claim 1 displaying one color;

exposing the dosimeter to an environment suspected of experiencing radiation less than 10 nm in wavelength; and determining if the dosimeter differed in color from the color displayed before exposing.

15. The high-energy radiation dosimeter of claim 1, further comprising a diffusion barrier covering the indicator layer distal to the plastic support.

* * * * *